J. V. WOOLSEY.

Hub for Vehicle Wheels.

No. 9,433. Reissued Oct. 26, 1880.

WITNESSES

E. J. Nottingham

Geo. D. Seymour

INVENTOR

Johnston V. Woolsey.

By Wells W. Leggett.

ATTORNEY

N. PETERS, PHOTO-LITHOGRAPHER, WASHINGTON, D. C.

UNITED STATES PATENT OFFICE.

JOHNSTON V. WOOLSEY, OF SANDUSKY, OHIO.

HUB FOR VEHICLE-WHEELS.

SPECIFICATION forming part of Reissued Letters Patent No. 9,433, dated October 26, 1880.

Original No. 149,625, dated April 14, 1874. Application for reissue filed April 10, 1880.

*To all whom it may concern:*

Be it known that I, JOHNSTON V. WOOLSEY, of Sandusky, in the county of Erie and State of Ohio, have invented a certain new and Improved Carriage-Wheel Hub, of which the following is a complete description, reference being had to the accompanying drawings, making part of this specification.

Figure 1:
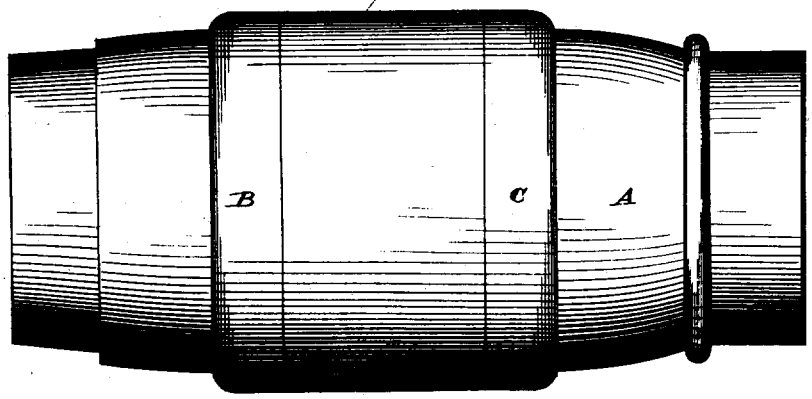
Figure 2:
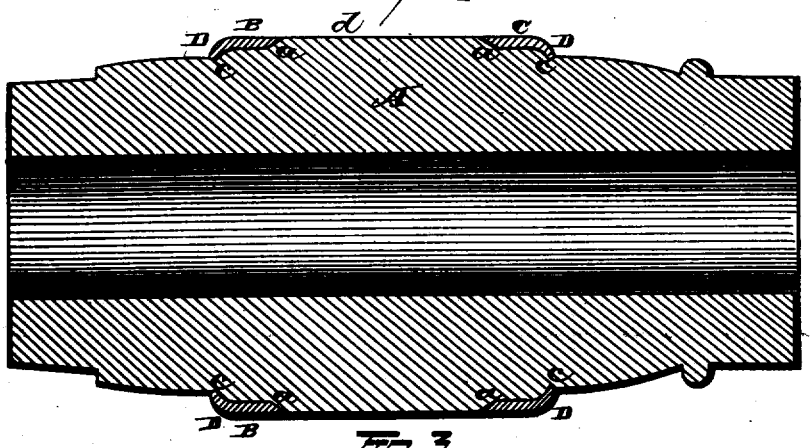
Figure 3:
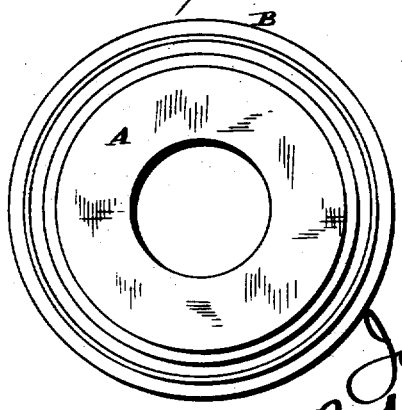

Figure 1 is a side view of the hub. Fig. 2 is a transverse section. Fig. 3 is an end view.

Like letters of reference refer to like parts in the several views.

This invention relates to a carriage-wheel hub; and the object sought to be obtained is the prevention of the ends of the mortises from giving way or crowding up by the pressure of the tenon of the spoke while it is being driven therein. For this purpose is used a band of a peculiar shape at each end of the mortise, which not only avoids the trouble above said, but which also prevents the hub from splitting or cracking.

Of the above invention the following is a more complete description.

In the drawings, A represents the hub, which is or may be of the ordinary wooden kind, having a middle projection, *d*. B C are bands surrounding the hub at each end of the mortise-space. It will be seen on examination of Fig. 2 that the under inner edge of each band is beveled back under the band, as shown at *a*, and that the outer edge of the bands is curved downward, and pressing into the wood, there being a groove made in the hub to receive the edge of the band as it is bent or pressed into it to a little depth, forming a shoulder for the curved edge of the band to rest against, and thereby prevent it from coming off or loose.

In driving the tenons of the spokes into their mortises the mortises at the surface are very liable to crowd out in consequence of the strain of the tenons against the ends. This crowding or forcing out of the wood weakens the ends of the mortises, so that there is less support for the tenon than if such forcing out of the wood had not been, to avoid which is the purpose of the bands referred to, which are pressed upon the hub at each end of the mortise flush with the surface. The outer edge is then rolled down and pressed into the wood, thereby forming a smooth rounded shoulder, D, while the edge *c*, pressed into the wood, prevents the band from coming off or loose.

On driving the spoke into the mortise the ends of the mortise, instead of being crowded or pushed out, will be crowded down under the band in consequence of the slant or bevel *a* on the under side, thereby compressing or packing the wood under the band, and thus making firm and solid ends to the mortises for the support of the tenons of the spokes.

What I claim as my invention, and desire to secure by Letters Patent, is—

1. A vehicle-wheel hub provided with a central cylindrical spoke-section and having a metallic ring located at a little distance away from the location for the spokes, said ring made flush upon its outer surface with the outer surface of the spoke-section and having a portion of its under surface projecting into the body of the hub, and beveled from its outer surface inward on that edge adjacent to the spoke-section, substantially as set forth.

2. A vehicle-hub provided with a central cylindrical spoke-section and having metallic rings located at a little distance away from the location for the spokes, said rings made flush upon their outer surfaces with the outer surfaces of the spoke-sections and having a portion of their under surface projecting into the body of the hub, and beveled from their outer surfaces inward on those edges adjacent to the spoke-section, substantially as described.

3. A wooden hub having a projecting spoke-section, a band located on the hub, its outer surface being flush with the surface of the spoke-section and beveled from its outer to its inner edge adjacent to the spoke-section, and having a portion of its interior projected into the body of the hub to prevent it from coming off, substantially as set forth.

4. The bands C B, with a curved edge, *c*, and a beveled edge, *a*, in combination with the hub A, having middle projection, *d*, the beveled edge *a* pressing against the projection and the curved edge *c* pressed into the wood, substantially as set forth.

JOHNSTON V. WOOLSEY.

Witnesses:

FREDERICK W. COGSWELL,
HENRY P. RADCLIFFE.